Figure 1:
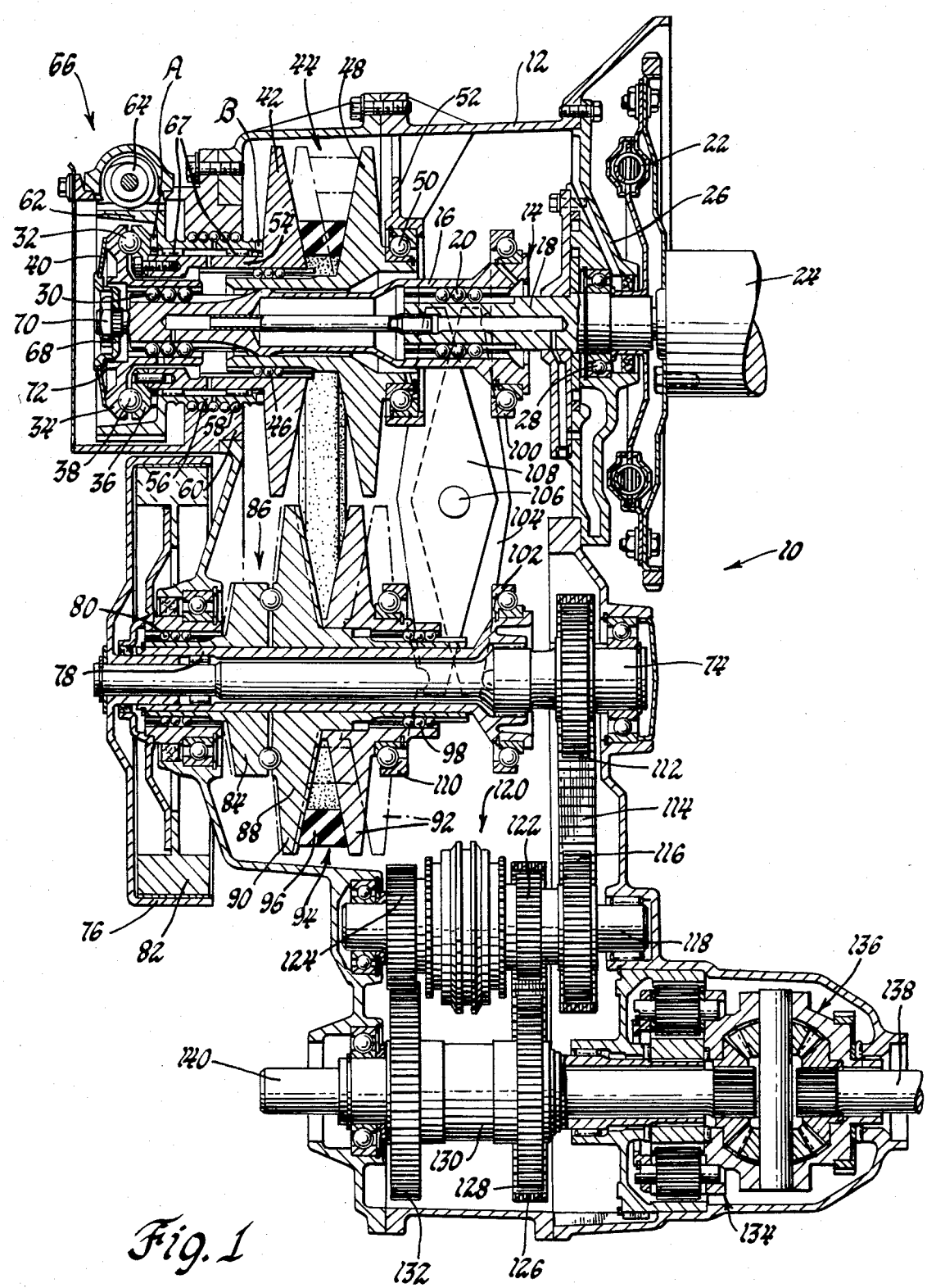

United States Patent [19]

Chana et al.

[11] Patent Number: 4,504,247
[45] Date of Patent: Mar. 12, 1985

[54] CONTROL MECHANISM FOR A VARIABLE RATIO DRIVE SYSTEM

[75] Inventors: Howard E. Chana, Troy; Calmer M. Stordahl, Rochester, both of Mich.

[73] Assignee: General Motors Corporation, Detroit, Mich.

[21] Appl. No.: 502,171

[22] Filed: Jun. 8, 1983

[51] Int. Cl.³ .............................................. F16H 11/06
[52] U.S. Cl. .......................................... 474/17; 74/857
[58] Field of Search ....................... 474/17, 19, 21, 24, 474/29, 30; 74/856, 857

[56] References Cited

U.S. PATENT DOCUMENTS

| | | | |
|---|---|---|---|
| 3,034,367 | 5/1962 | Steuer | 474/19 |
| 3,102,431 | 9/1963 | Maurer | 474/29 |
| 3,110,189 | 11/1963 | Steuer | 474/21 |
| 3,490,301 | 1/1970 | Steuer | 474/21 |
| 3,590,649 | 7/1971 | Fischer | 474/29 |
| 4,116,080 | 9/1978 | Berens | 474/21 |
| 4,196,641 | 4/1980 | Vogel | 474/19 |

Primary Examiner—Stephen J. Novosad
Assistant Examiner—Bruce M. Kisliuk
Attorney, Agent, or Firm—Donald F. Scherer

[57] ABSTRACT

A variable ratio pulley system has a pair of pulleys mounted on input and output shafts, respectively, and interconnected by a drive belt. The pulleys are adjustably controlled in axial width to establish the drive ratio between the shafts. Each pulley has a load cam sensitive to the torque load being imposed on the respective shaft. The load cams are interconnected by a linkage and preload spring which establishes the minimum axial force operable on the pulleys. The linkage transmits forces between the pulleys thereby imposing a tension force on the belt established by the greater of the forces generated at the load cams. A drive ratio selector is connected to one side of the input pulley to add or subtract a force so that the axial forces on the input and output pulleys are properly balanced when the desired drive ratio is established. The output shaft of the pulley system is connected through a starting mechanism to a forward-reverse gear arrangement and then to a final drive and gear differential.

3 Claims, 2 Drawing Figures

CONTROL MECHANISM FOR A VARIABLE RATIO DRIVE SYSTEM

This invention relates to variable ratio belt drives and more particularly to control mechanisms for such drives.

Prior art control mechanisms generally utilize a pair of skewable linkage arms disposed between the pulley members. These linkages are arranged to increase the width of one pulley while decreasing the width of the other. Other prior art systems have utilized the above-mentioned linkage systems in cooperation with load cam mechanisms which operate in conjunction with the linkage to establish separate forces on each pulley. The linkages in these systems establish the basic drive ratio while the cams add to the belt tension forces. These systems generally do not permit automatic ratio change during operation. They do require a manual change to the skewable linkage mechanism and in some instances an adjustment of the pivoting point of the linkage mechanisms.

Other prior art controls include a load cam operable on one pulley and a bias spring operable on the other. These mechanisms provide an automatic ratio change which is responsive to the torque sensitive portion of the system as balanced against a spring bias. These systems do not have any mechanical interconnection between the pulleys.

The present invention provides an improved control mechanism for a variable ratio pulley drive system wherein a load sensitive cam structure is connected between each pulley and its respective shaft to apply an axial load to the pulleys and also wherein a drive ratio selector is operatively connected to one of the pulley and load cam structures to add to or subtract from the force imposed thereon to thereby maintain an axial load on the pulleys which will establish the required belt tension and force balance. The belt tension is important in that it is proportional to the torque transmitting capacity of the pulley system. Given the torsional loads on the input and output shafts, the desired transmission ratio between the pulleys is readily established by superimposing a control force so as to establish the required balancing of forces at the torque transmission level which is present.

The present invention also provides, as one of its primary objects, an improved control mechanism for a variable ratio pulley drive system wherein the load cam structures disposed on the input and output shafts are interconnected by a floating linkage for transmitting the higher of the load cam axial forces to both pulley systems and wherein one pulley is operatively connected with a ratio selector mechanism for adding to or subtracing from the axial force load imposed by the cam structures.

A further object of the present invention is to provide an improved control mechanism for a variable ratio pulley drive system wherein a load sensitive cam structure is connected between each of the input and output shafts and their respective pulleys to apply an axial load to the pulleys in proportion to the torque transmitted by the shaft and also wherein the load cam structures are interconnected by a linkage and a preload spring mechanism which establishes a minimum axial load on both pulleys and permits a predetermined amount of axial movement to compensate for geometric error occurring between the extreme ends of the ratio range. The linkage being operable to transmit the higher of the axial forces established by the load cam structures and wherein the control mechanism also includes a ratio selector operatively connected with one of the pulleys for adding to or subtracting from the axial load imposed thereon by the load cam structures.

Figure 2:
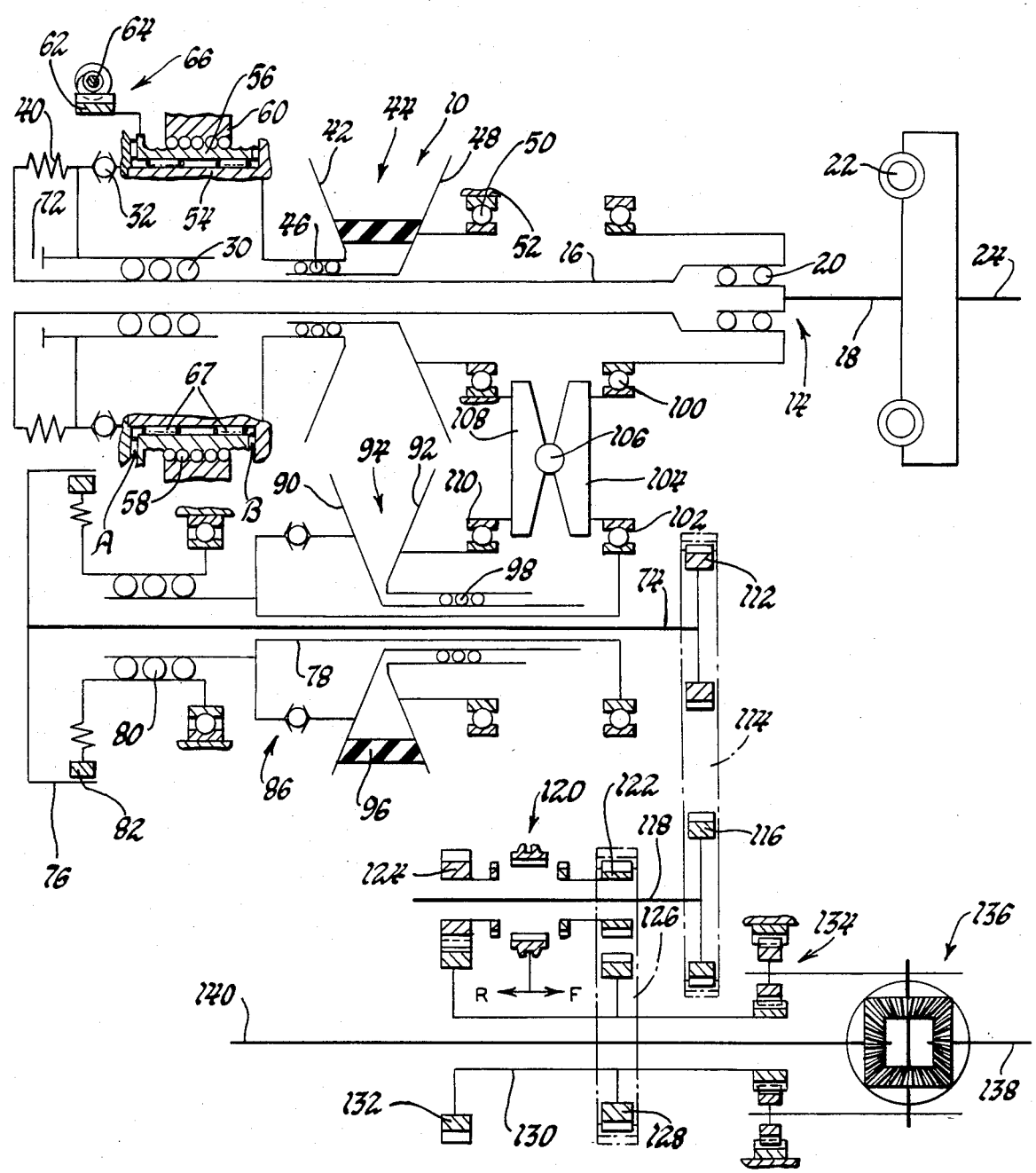

These and other objects and advantages of the present invention will be more apparent from the following description and drawings in which:

FIG. 1 is a cross-sectional elevational view of a transmission and control mechanism incorporating the present invention; and FIG. 2 is a schematic representation of the mechanism shown in FIG. 1.

Referring to the drawings, there is seen in FIG. 1 a variable belt drive transmission, generally designated 10, having a multipiece transmission housing 12. The appropriate characters will be used to designate the same components in FIGS. 1 and 2. While the primary discussion will center itself on FIG. 1, it is considered that the schematic representation of FIG. 2 will provide a pictorial representation which is less cluttered from a drafting standpoint.

The transmission 10 includes an input shaft 14 which has two shaft portions 16 and 18 interconnected by a ball spline 20. The shaft portion 18 is connected through a vibration damper 22 to a prime mover drive shaft 24. The shaft portion 18 is rotatably supported in an end cover 26 by a bearing 28. The end cover 26 is secured to the transmission housing 12.

The shaft portion 16 is connected through a ball spline 30 to an input load cam structure 32. The input load cam structure 32 has a pair of cam races 34 and 36 interconnected by a plurality of balls 38. The cam races 34 and 36 are urged toward each other by a preload spring 40. The cam race 34 is connected to the ball spline 30 while the cam race 36 is connected to one sheave 42 of an input pulley, generally designated 44. The sheave 42 is connected by a ball spline 46 to the other sheave 48 of input pulley 44. The sheave 48 is rotatably supported by a bearing 50 which is secured in a wall member 52 formed integrally with or otherwise connected to the transmission housing 12. Thus, the sheave 48 is axially positioned relative to the transmission housing 12.

The sheave 42 includes a sleeve portion 54 which is secured to cam race 36 and surrounded by a ball nut 56. The ball nut 56 is connected through a plurality of balls 58 to a threaded member 60 secured in the transmission housing 12. The ball nut 56 has integrally formed therewith or otherwise secured thereto, a worm gear 62 which meshes with a worm 64 and cooperates therewith to provide a drive ratio selector mechanism 66. The ball nut 56 is disposed between cam race 36 and sheave 42 and is grounded to the transmission housing 12 in such a manner that rotation of the worm 64 can result in the selective imposition of various loads on either sheave 42 through bearing B or cam race 36 through bearing A.

The input load cam structure 32 senses the torque transmitted by input shaft 14 and could impose an axial load on pulley 44 in proportion to the torque transmitted. If the drive ratio selector 66 is operated to impose a load on sheave 42, such load will be additive to the axial load of cam structure 32. If the drive ratio selector 66 is operated to impose an axial load on cam race 36, it will subtract from the load imposed through input load cam structure 32 onto pulley 44. Pulley sheave 42 is supported in housing 12 by bearings 67.

The preload spring 40, as seen in FIG. 1, is connected to the shaft portion 16 through a washer 68 and fastener 70. The preload spring 40 urges the shaft portion 16 leftward and the cam race 34 rightward so that a gap 72 is developed therebetween.

The housing 12 also rotatably supports a pulley output shaft 74 to which is drivingly connected a clutch drum 76. Rotatably supported on the pulley output shaft 74 is a sleeve shaft 78 which is drivingly connected through a ball spline 80 to a centrifugal clutch 82. The sleeve shaft 78 is also connected to a cam race 84 which is a component of an output load cam 86. The output load cam 86 has another cam race 88 which is formed integrally with or otherwise secured to a sheave 90. The sheave 90 cooperates with a sheave 92 to form an output pulley, generally designated 94. The pulley 94 is drivingly connected to the pulley 44 by a belt 96. The sheaves 90 and 92 are interconnected by a ball spline 98.

The shaft portion 16 has secured thereto a bearing 100 and the sleeve shaft 78 has secured thereto a bearing 102. These bearings 100 and 102 are contacted by a link 104 which is pivotally connected through a pin 106 to a link 108. The link 108 is in contact with the transmission housing 12 through wall 52 and is in contact with sheave 92 through a bearing 110.

The preload of spring 40 acts on shaft portion 16 urging it leftward such that the upper ends of linkages 104 and 108 will be urged together resulting in separation of the lower ends of linkages 104 and 108.

As best seen in FIG. 2, the separation of the lower ends of linkages 104 and 108 result in axial forces on sheaves 90 and 92 urging them together. The axial force on bearing 102 acts on sheave 90 through sleeve shaft 78 and output load cam 86 while the load on bearing 110 acts directly on sheave 92. The output load cam 86 is sensitive to the torque transmitted to the pulley output shaft 74. The torque on load cam 86 is such that an axial force is imposed between sheave 90 and bearing 102. This axial force urges the sheaves 90 and 92 toward each other and simultaneously imposes the same axial load on bearings 102 and 110. The axial load on bearing 102 is transmitted through the link 104 to the bearing 100. From bearing 100, this axial force is imposed on the input load cam 32 and therefore sheave 42 of pulley 44. Sheave 48 is axially loaded through the belt 96 and reacts against bearing 50.

The axial force generated by input load cam 32 is likewise imposed on load cam 86. Thus, it is obvious that whichever of the load cams 32 or 86 generates the higher axial force, it is that higher axial force which will be imposed on both pulleys 44 and 94 but altered on the input pulley by ratio selector mechanism 66.

It is preferred for the underdrive and overdrive ratios selected in the present invention to use a 1:1 linkage system with the components 104 and 108. However, should it be desired to provide a ratio other than 1:1 between the load cam structures for other ratios and cam loadings, it will be readily apparent to those skilled in the art that such force and displacement ratios can be attained by changing the ratio in the linkages 104 and 108.

The forces transmitted by the load cams 86 and 32 must pass through the preload spring 40. When the load of preload spring 40 is overcome, the gap 72 will be closed such that solid contact between shaft portion 16 and cam race 34 will be present.

In general practice, the preload of spring 40 will be overcome during most drive conditions such that the gap 72 will be generally nonexistent. However, the gap 72 will permit adjustment within the system to compensate for a geometric error which occurs in a belt drive when going from a full underdrive ratio through 1:1 to a full overdrive ratio. During the underdrive ratio, the belt 96 is at a minimum diameter in pulley 44 and a maximum diameter in pulley 94. At a maximum overdrive condition, the sheave 42 will have moved rightward so that the belt 96 will move outward to a maximum diameter on pulley 44 and inward to a minimum diameter on pulley 94. Due to the differences in wrap angle on the pulleys, it is necessary to compensate for the fixed belt length.

At the maximum underdrive ratio, the input load cam will be bottomed out since the output torque will be highest, while at maximum overdrive, the output load cam will be bottomed out since the input torque will be highest. The gap 72 cooperates with the load cams to provide the required movement to compensate for the geometric error which will occur during a change from full underdrive to full overdrive.

The pulley output shaft 74 has connected thereto a sprocket 112 to which is drivingly connected a toothed chain 114. The chain 114 meshes with a sprocket 116 which is drivingly connected to an idler shaft 118. The idler shaft 118 has drivingly connected thereto a conventional mechanical synchronized clutch assembly 120 which is selectively operable to connect a forward sprocket 122 and also a reverse gear 124 to the idler shaft 118. The forward sprocket 122 is drivingly connected through a toothed chain 126 to a drive sprocket 128 which is drivingly connected to a sleeve shaft 130. The reverse gear 124 meshes with a reverse gear 132 which is also drivingly connected to the sleeve shaft 130. The sleeve shaft 130 is connected to a planetary final reduction drive 134 which in turn is drivingly connected to a differential gear assembly, generally designated 136. The differential 136 is drivingly connected to a pair of axle shafts 138 and 140 which are adapted to drive vehicle wheels, not shown, in a conventional manner.

The forward-reverse drive arrangement provided by synchronizer 120, sprockets 122 and 128 and gears 124 and 132 is a conventional drive arrangement such that further description is not considered necessary since those familiar with the power transmission art will understand the operation. This same is true of planetary reduction 134 and differential gearing 136.

The pulley 94 is drivingly connected to the shaft 74 through the load cam 86 and the centrifugal clutch 82. Thus, when the vehicle is stationary and a low input speed is present, the pulley 94 will be disconnected from the shaft 74. During this condition, the drive selector mechanism 66 will generally be conditioned for maximum underdrive such that the pulley 94 will be rotating much slower than pulley 44. However, as the speed of drive shaft 24 is increased, for example as the vehicle throttle pedal is depressed to increase the output speed of a prime mover such as an internal combustion engine, both pulleys 44 and 94 will increase in speed. As pulley 94 increases in speed, the centrifugal clutch 82 will begin to engage clutch drum 76 thereby urging rotation of the shaft 74 and through the chain 114 and the drive gearing, the shafts 140 and 138. This will impose a torque load on shaft 74 resulting in an increase in the axial force transmitted by output load cam mechanism 86.

For the following description, it will be assumed that the engine or prime mover, not shown, is operated at maximum torque which is assumed to be 110 foot pounds. It is further assumed that the maximum underdrive ratio is 2.37:1 and the maximum overdrive ratio is 0.422:1, a specific coefficient of friction exists, and a desired traction safety factor is maintained. The axial force generated by input load cam 32 will be equal to 19.8 times the torque on the input shaft and the axial force generated by the output cam will be 24.68 times the torque on the output shaft. During these conditions of maximum underdrive, the input cam 32 generates an axial force of 2178 pounds while the output cam 86 generates an axial force of 6434 pounds. Since output cam force is higher, this load is felt through the linkages by both pulleys. During this condition, the input pulley 44 desires an axial force of 6030 pounds to remain in equilibrium. The difference of 404 pounds is obtained from the drive ratio selector 66 which through the ball nut 56 imposes this force on the cam race 36 subtracting it from the input pulley squeeze.

To maintain the maximum overdrive ratio of 0.422:1 at the maximum input torque of 110 foot pounds, the input cam generates 2178 pounds while the output cam generates 1146 pounds. Under these conditions, the equilibrium force balance is 4072 pounds on the input pulley and 2178 pounds on the output pulley. To obtain this balance, an additional force of 1894 pounds must be added to the squeeze force on the input pulley 44 through the drive ratio selector 66. Thus, it is seen that the drive ratio selector 66 operates from 404 pounds in a leftward direction at maximum underdrive, and 1894 pounds in a rightward direction at maximum overdrive. To adjust the drive ratio from one extreme to the other, it is simply necessary to rotate the worm 64 such that the balance force imposed is adjusted accordingly. At a 1:1. drive, the input load cam will supply a force of 2178 pounds and the output cam a force of 2714 pounds. The 2714 pound force will be imposed on the output pulley 94 and the input pulley 44. To maintain equilibrium at this condition, however, a force of 2867 pounds is required at the input pulley. Therefore, it is seen that a force of 153 pounds will be added to the input pulley 44 by the drive ratio selector 66.

It should be apparent that controlling the drive ratio selector 66 at the desired position will result in the desired drive ratio between the pulleys and the appropriate balanced axial loads on the input and output pulleys. It should be appreciated from the above description that the linkages 104 and 108 are fixed at only one end, that is, the end of linkage 108 which abuts wall 52 of housing 12. The rest of the linkage, including the pin 106 is free floating. This permits substantial alignment of the belt 96 during ratio changes from maximum underdrive to maximum overdrive.

The worm 64 of drive ratio selector 66 can be controlled by any of the well-known control mechanisms such as an electric motor or hydrualic motor. If desired, the worm 64 could be replaced with a rack such that linear movement of the rack would result in rotary movement of the gear 62. When using an electrical or hydraulic control for the worm 64, various control parameters including engine speed, engine throttle and output speed can be utilized. The use of these control functions is well-known to those skilled in the art of transmission control mechanisms such that an involved discussion of their structures is not necessary.

The embodiments of the invention in which an exclusive property or privilege is claimed are defined as follows:

1. An improvement in ratio controls for a belt and pulley system wherein each pulley has at least one movable member and the belt and pulley system has an input shaft and an output shaft; the improvement comprising: output torque sensitive cam means disposed between the output shaft and one movable member of one pulley for applying an axial force proportional to the output torque to the one pulley to control belt tension; input torque sensitive means disposed between the input shaft and one movable member of another pulley for applying an axial force proportional to the input torque of the other pulley to control belt tension; and ratio selector means for selecting ratios and for applying a force in addition to or subtraction from the force on the other pulley for balancing the forces on both pulleys when the ratio selected is achieved and the belt tension is controlled.

2. An improvement in ratio controls for a belt and pulley system wherein each pulley has at least one movable member and the belt and pulley system has an input shaft and an output shaft; the improvement comprising: output torque sensitive cam means disposed between the output shaft and one movable member of one pulley for applying an axial force proportional to the output torque to the one pulley to control belt tension; input torque sensitive means disposed between the input shaft and one movable member of another pulley for applying an axial force proportional to the input torque of the other pulley to control belt tension; force transmitting link means and preload spring means interconnecting said torque sensitive means for establishing an initial axial force in the belt system; and ratio selector means for selecting ratios and for applying a force in addition to or subtraction from the force on the other pulley for balancing the forces on both pulleys when the ratio selected is achieved and the belt tension is controlled.

3. An improvement in ratio control for a variable drive ratio belt and pulley system wherein there is an input and output pulley with the drive ratio therebetween determined in part by the axial force on the pulleys and wherein each pulley has at least one movable member and also wherein the belt and pulley system has an input shaft drivingly connected to the input pulley and output shaft drivingly connected to the output pulley; the improvement comprising: output torque sensitive cam means disposed between the output shaft and the movable member of the output pulley for applying an axial force proportional to the output force thereto to establish a belt tension at the output pulley; input torque sensitive means disposed between the input shaft and the movable member of the input pulley for applying an axial force proportional to the input torque thereto to thus establish a belt tension at the input pulley; force transmitting link means for applying the greater of the axial forces to both pulleys; and ratio selector means for selecting ratios and for applying a force in addition to or subtraction from the force on one of the pulleys for maintaining the force proportional to the respective torque levels while balancing the forces on both pulleys when the ratio selected is achieved and proper belt tension is maintained.

* * * * *